R. N. EHRHART.
MEANS FOR WITHDRAWING NON-CONDENSABLE VAPORS FROM CONDENSERS.
APPLICATION FILED JAN. 18, 1919.
Reissued July 1, 1919. 14,678.
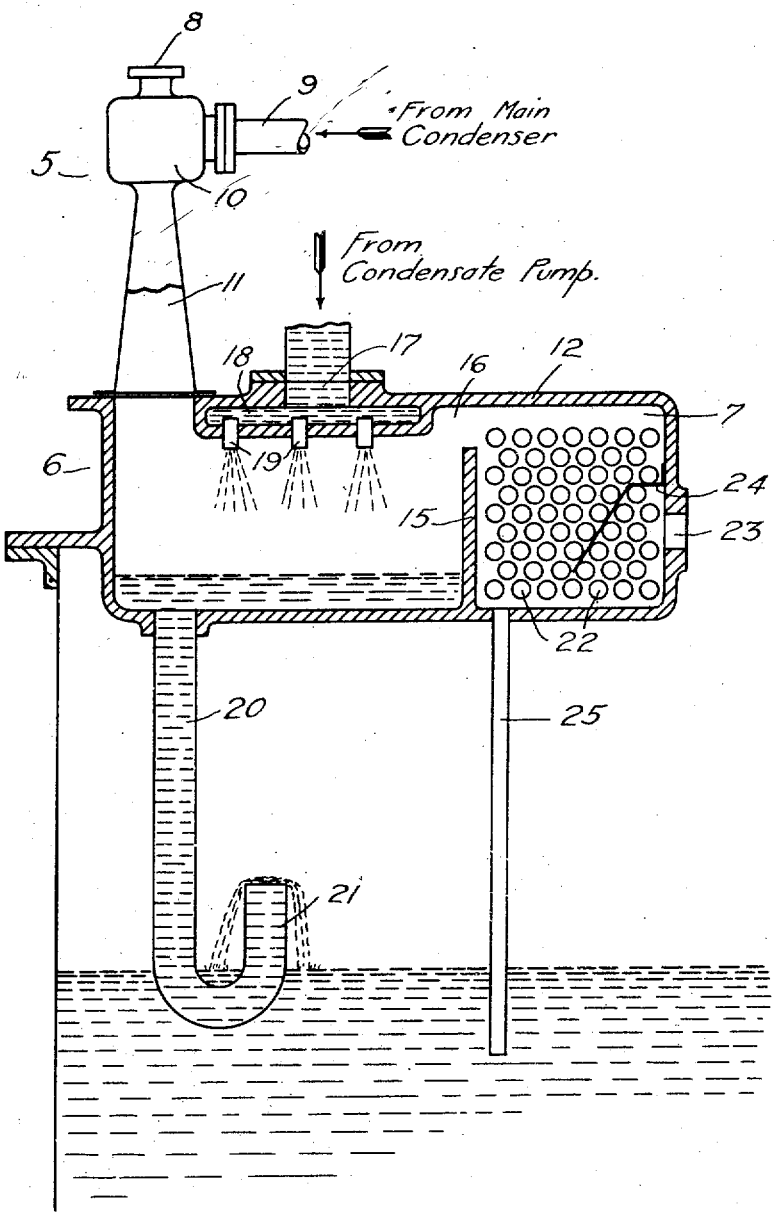
INVENTOR.
Raymond N. Ehrhart
BY E. M. McCallister
ATTORNEYS.

UNITED STATES PATENT OFFICE.

RAYMOND N. EHRHART, OF EDGEWOOD, PENNSYLVANIA, ASSIGNOR TO WESTINGHOUSE ELECTRIC & MANUFACTURING COMPANY, A CORPORATION OF PENNSYLVANIA.

MEANS FOR WITHDRAWING NON-CONDENSABLE VAPORS FROM CONDENSERS.

14,678. Specification of Reissued Letters Patent. Reissued July 1, 1919.

Original No. 1,284,271, dated November 12, 1918, Serial No. 123,978, filed October 5, 1916. Application for reissue filed January 18, 1919. Serial No. 271,920.

*To all whom it may concern:*

Be it known that I, RAYMOND N. EHRHART, a resident of Edgewood, in the county of Allegheny and State of Pennsylvania, have made a certain new and useful Invention in Means for Withdrawing Non-Condensable Vapors from Condensers, of which the following is a specification.

This invention relates to means for withdrawing non-condensable vapors or gases from condensers, and has for an object to produce a simple and compact apparatus for abstracting air or other non-condensable gases or vapors from condensers, for conserving the heat withdrawn from the condenser, and at the same time, maintaining the vacuum within the condenser under all conditions of fluid flow to which the condenser may be subjected.

In marine installations and in some land installations, it is not only necessary to conserve the heat withdrawn from the condenser, but it is also necessary to conserve water which may be suitable for feed water purposes.

A further object of my invention is therefore to produce simple and compact means for withdrawing the water of condensation and the non-condensable gases or vapors from a condenser, for conserving substantially all of the heat withdrawn from the condenser and for conserving all of the water which is delivered in the form of steam or vapor to the condenser and to the apparatus.

A further object is to produce an apparatus for withdrawing non-condensable gases and vapors from a condenser, for conserving as nearly as possible all of the heat withdrawn from the condenser and discharged from the apparatus, and which operates effectively under varying conditions of condensation within the condenser.

A further object is to produce apparatus for maintaining a high vacuum within a condenser under varying conditions of steam flow into the condenser and without employing so called automatic devices in which movable parts are adjusted by variations in operating conditions.

These and other objects are attained by means of apparatus herein described and illustrated in the single sheet drawing accompanying and forming a part hereof.

The drawing is a diagrammatic sectional illustration of apparatus embodying my invention.

The apparatus illustrated includes an injector 5, which is adapted to withdraw non-condensable gases and vapors from a condenser and which discharges into a combined feed water heater and condenser 6. Water of condensation from the main condenser is delivered to the combined heater and condenser in such a way as to condense the motive fluid, hereinafter termed steam, discharged from the ejector. Inasmuch as the quantity of condensate available for condensing the steam discharged from the ejector is dependent upon the amount of steam delivered to the main condenser, it will vary in accordance with variations of steam flow to the main condenser. The discharge of steam from the ejector will, however, remain substantially constant and consequently, under some operating conditions, the condensate delivered to the combined heater and condenser 6 will not be sufficient to condense all of the steam issuing from the ejector. In order to maintain the back pressure on the ejector substantially constant and at the same time to conserve all of the steam issuing from the ejector, I employ an auxiliary condenser 7, which is illustrated as a surface condenser, is permanently in open communication with the feed water heater 6 and is provided with an air vent 23 for discharging the non-condensable gases and vapors into the atmosphere.

The ejector apparatus may be of any type capable of withdrawing air or non-condensable gases from a condenser and discharging at atmospheric pressure. The apparatus illustrated consists of a single stage ejector having a combining chamber 10, a steam delivery nozzle, and a diffuser 11. Steam is delivered to the steam delivery nozzle or nozzles through a port 8, which communicates with a suitable source of steam supply. The combining chamber 10 is provided with an inlet port which, as shown, is adapted to communicate with an air off take-port of the main condenser through a suitable pipe or passage 9.

The ejector discharges into the combined heater and condenser 6, and the mixture of steam, vapor and non-condensable gases issuing from the ejector is subjected to the condensing and cooling action of the water of condensation withdrawn from the main condenser. As shown, the water of condensation is sprayed into the interior of the heater 6 in such a way that all of the fluid mixture issuing from the ejector is subjected to its cooling and condensing action. This may be accomplished in various ways, but as illustrated, I have provided a distributing chamber 18 in the top of the heater which is adapted to communicate with the outlet port of a condensate pump through a port 17, it being understood that the condensate pump withdraws condensate from the main condenser and delivers it to the distributing chamber 18. The chamber 18 is provided with a series of spray nozzles 19, which are adapted to discharge the condensate into the condensing chamber of the heater and may be so arranged that the water issues from them in the form of spray which more or less fills the interior of the heater. This water and also the water of condensation, resulting from the condensation of the steam issuing from the ejector, collects in the bottom of the heater and is discharged therefrom through a pipe 20, which is shown turned up at its discharge end for the purpose of forming a water seal and for preventing steam from blowing out through the pipe 20 in case the amount of condensing water delivered to the heater is not sufficient to condense all of the steam discharged from the ejector. The pipe 20 preferably discharges into the hot well or other receptacle for collecting feed water.

For the purpose of preventing the heater from becoming air bound I have provided a vent port 23, through which air and other non-condensable gases may be discharged into the atmosphere. The vent port is shown formed in the shell of the auxiliary condenser 7, and communication is established between the condenser 7 and the interior of the heater 6 through a port 16, which is permanently open. The auxiliary condenser is shown as a surface condenser and consequently is provided with cooling tubes 22, which extend across its interior. These tubes are located between the ports 16 and 23 and consequently form circuitous passages within the condenser 7 through which fluid issuing from the heater 6 must travel in passing toward the port 23. The condenser 7 may be of the usual form and its water boxes may be so connected that the tubes will be supplied with cooling water in the ordinary manner. Separate means may be employed for delivering cooling water to the auxiliary condenser, although I contemplate connecting the water passages of that condenser so that they will receive a portion of the water delivered by the main circulating pump which serves the main condenser. With this arrangement of apparatus, it will be apparent that if the condensate delivered from the main condenser is not sufficient to condense the steam delivered to the heater, uncondensed steam will pass through the port 16 into the auxiliary condenser. In fact, the auxiliary condenser is preferably of such size that it will be capable of condensing all of the steam discharged from the ejector 5, under operating conditions such that no condensate is delivered from the main condenser to the heater or jet condenser 6. The condensate collected in the auxiliary condenser is delivered to the hot well or receptacle for collecting feed water through a pipe 25. In order to prevent steam from being blown out through the vent port 23 I have provided a baffle 24, which extends downwardly over the port and is so arranged that it prevents steam from passing from the port 16 to the port 23 without coming into intimate contact with one or more cooling tubes 22.

One of the advantages of the apparatus illustrated is that under normal operating conditions substantially all of the heat withdrawn from the condenser and all of the heat discharged with the steam issuing from the ejector 5 is conserved. The heat withdrawn from the main condenser with the water of condensation is, of course conserved, and this water is further heated by the condensation of the steam issuing from the ejector 5. A portion of the heat carried by the non-condensable gases withdrawn from the main condenser is also conserved, since it is given up to the water of condensation. The steam, which may pass the port 16, is condensed within the condenser 7 and consequently the apparatus not only conserves heat but also prevents steam or water from being wasted by the discharge of steam into the atmosphere. Under abnormal conditions, a portion or all of the steam issuing from the ejector 5 is condensed in the auxiliary condenser 7. This condenser is called into operation without the necessity of providing automatic devices having moving parts, and it only receives steam which the jet condenser 6 is not capable of condensing.

As illustrated, the jet condenser 6 and the surface condenser 7 are located within the same shell, but are separated by a partition wall formed within the shell.

While I have described but one embodiment of my invention, it will be apparent to those skilled in the art that various changes, modifications, additions and omissions may be made in the apparatus illustrated without departing from the spirit and scope of my invention as set forth by the appended claims.

What I claim is:

1. In combination with a steam actuated ejector, a receptacle having an atmospheric vent port and an inlet port through which said ejector discharges, a means for delivering a water spray into said receptacle between said inlet port and said vent port, and a series of cooling tubes located between said spray delivery means and said vent port.

2. In combination with a steam actuated air ejector, a receptacle having an inlet port with which the exhaust of said ejector communicates, and an atmospheric vent port, means for delivering a water spray within said receptacle and between said ports, a series of tubes located between said spray delivery means and said vent and surrounding said vent, and means for delivering cooling water through said tubes.

3. In combination with a main condenser, a steam actuated air ejector for withdrawing noncondensable fluids from the condenser, a receptacle having an inlet port, through which said ejector discharges, and an atmospheric vent port, a spray nozzle located within said receptacle between said ports, means for delivering water of condensation from said condenser to said spray nozzle, a series of cooling tubes surrounding said vent port and between it and said inlet port, and means for delivering cooling water to said tubes.

4. In combination with a steam actuated air ejector, a receptacle having an inlet port through which said ejector discharges into the receptacle, and an atmospheric vent port, means for delivering condensing water into said receptacle so as to interpose condensing water between the inlet port and the vent port and to insure an intimate mixture of the fluids discharged from the ejector and the condensing water delivered to the receptacle, a series of cooling tubes within said receptacle located between said inlet port and said vent port and surrounding the vent port, and means for delivering cooling water to said tubes.

5. In combination with a condenser, a steam actuated air ejector for withdrawing non-condensable fluids from the condenser, a receptacle having an atmospheric vent port and an inlet port through which the ejector discharges into the receptacle, means for delivering condensate from the condenser into said receptacle so as to interpose condensate between the inlet port and the vent port and insure an intimate mixture of fluids discharged from the ejector and the condensate delivered to the receptacle, a series of cooling tubes located within the receptacle between the inlet port and the vent port and surrounding the vent port, and means for delivering cooling water to the cooling tubes.

In testimony whereof, I have hereunto subscribed my name this 15th day of January, 1919.

RAYMOND N. EHRHART.